April 28, 1931.  M. WALLACE  1,802,688
BEAM NETWORK SYSTEM
Filed May 6, 1930  2 Sheets-Sheet 1
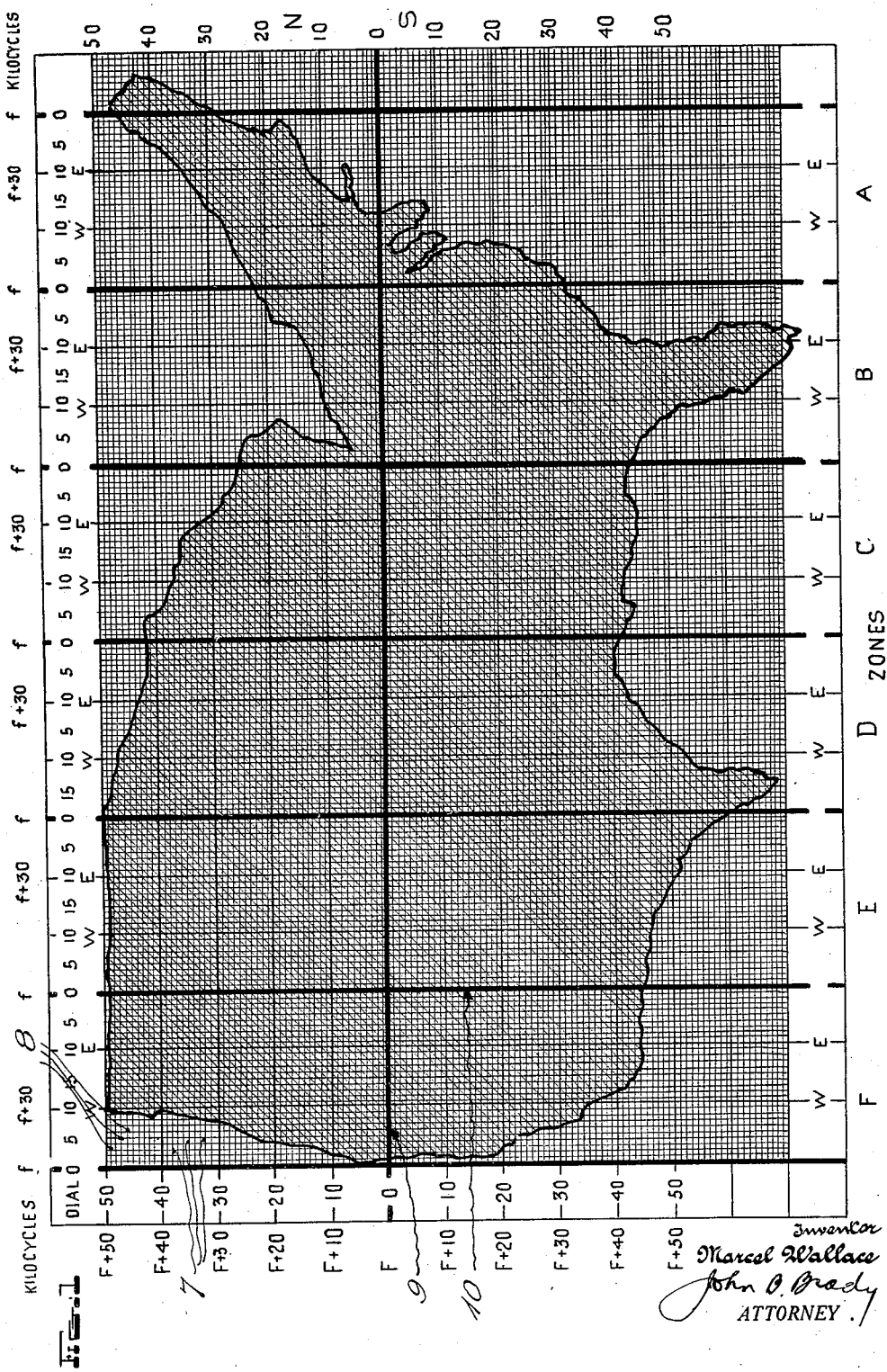

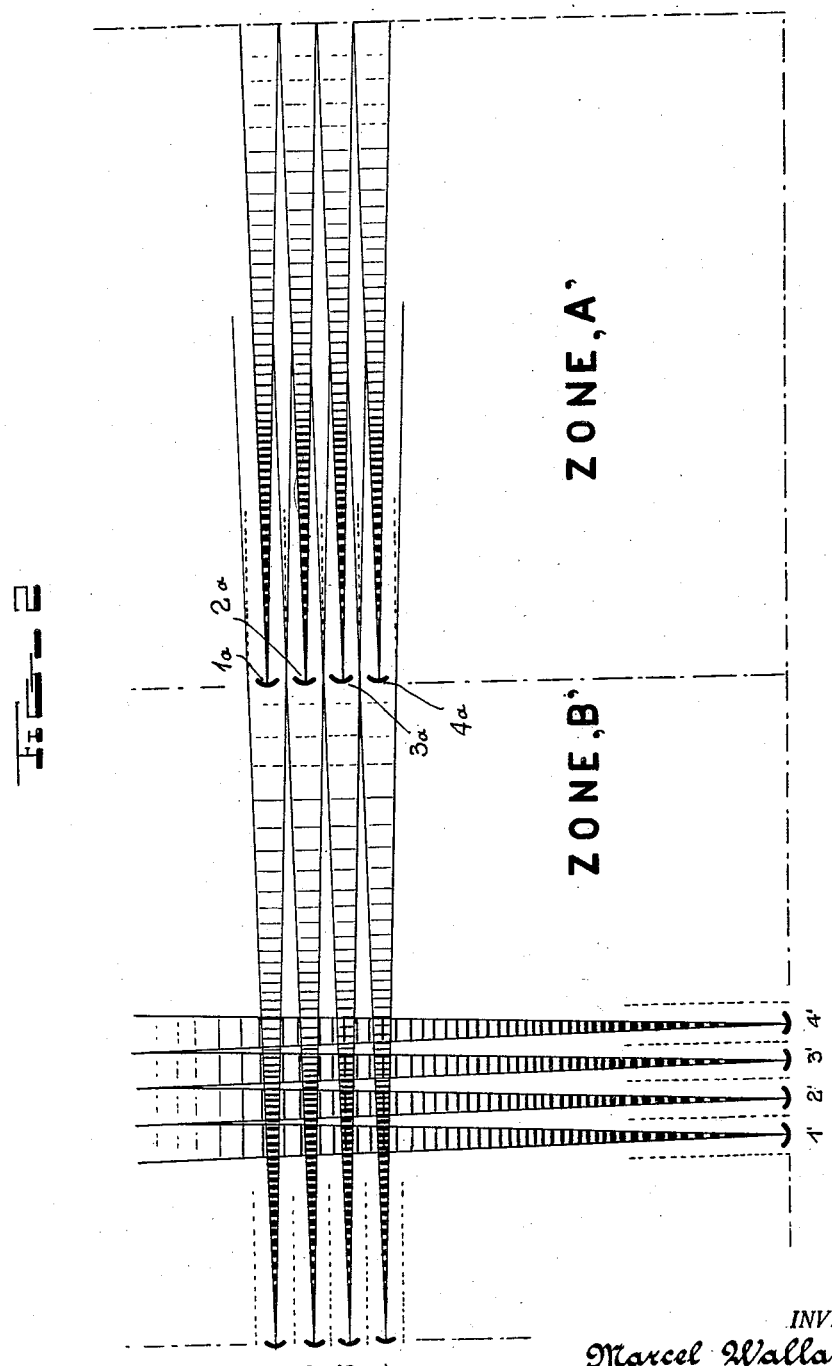

Patented Apr. 28, 1931

1,802,688

UNITED STATES PATENT OFFICE

MARCEL WALLACE, OF ST. GEORGE, NEW YORK, ASSIGNOR OF ONE-THIRD TO EDWARD L. CORBETT, OF BRONX COUNTY, NEW YORK

BEAM NETWORK SYSTEM

Application filed May 6, 1930. Serial No. 450,176.

My invention relates broadly to radio systems of navigation and more particularly to a beam network system for directively establishing paths of high frequency energy for the guiding of mobile craft.

One of the objects of my invention is to provide a system of high frequency energy transmission for establishing a network of directive high frequency beams for reception on mobile bodies movable with respect to the beam network for enabling the mobile body to receive signals for indicating the position of the mobile body.

Another object of my invention is to provide a beam network for the radiation of signaling energy in directed paths according to a periodical variation in a multiplicity of zones extending over a large area of land or sea.

A further object of my invention is to provide a system of transmission in which a multiplicity of directed paths of signaling energy are established where the channels are characterized by the step by step progression in frequency of signaling characteristic for enabling a mobile body carrying the receiving apparatus to identify its position with respect to the signaling channels by observing the character thereof.

A still further object of my invention is to provide an arrangement of beam network for the transmission of high frequency signaling energy in directed paths normal one to another over a large area of land or sea for providing a positive identification means for aircraft or vessels in determining the position thereof by the reception of signals of differing characteristics from the several beams of the network.

Other and further objects of my invention reside in the transmission system set forth more fully in the specification hereinafter following by reference to the accompanying drawings, in which:

Figure 1 is a representative arrangement of a beam network system established in the United States for the guiding of aircraft; and Fig. 2 is a schematic view showing the arrangement of beam network stations which I employ in the transmission system of my invention.

My invention is illustrated herein as applied particularly for the navigation of aircraft but it will be understood that the system is equally applicable for the navigation of ships and that in describing my invention in connnection with aircraft navigation, it will be understood that I also have in mind the application of the beam network system as an aid to navigation of ships at sea.

My invention contemplates the installation of a multiplicity of directional transmitters in predetermined locations throughout the country for establishing a network of directionally transmitted beams of signaling energy covering the entire area of the country in which aircraft is navigated. I arrange a multiplicity of directive transmitters for the propagation of relatively narrow paths of high frequency signaling energy in both north and south and east and west directions throughout the country. A directionally transmitted beam of radio frequency energy has its maximum energy directly upon the center line extending through the transmitting station and this energy drops to about one-half its effective value at one degree on each side of the center line of the transmitter and then the energy drops abruptly to zero. There may be secondary beams at three or four degrees on each side of the centrally propagated beam and there may be more widely distributed tertiary beams, but the signaling energy on such secondary or tertiary beams are incapable of interference with the receiving system inasmuch as these beams diminish to substantially zero in intensity. For example, at a distance of 1,000 miles, a length of only 33 miles subtends an angle of two degrees from the transmitter. Therefore, such a beam does not spread more than 33 miles when 1,000 miles distant from the station. At 600 miles the width of a beam would only be about 20 miles. If the beacon transmitting stations are therefore spaced 20 miles apart, simultaneous transmission on the beams will cause an overlapping of the beams at approximately 600 miles away from the transmitter. To avoid needless overlapping, I provide repeating stations in alignment with the initial transmitting stations having the effect of pushing the beam further across the country with greater intensity so that the overlapping portion of the beacons is of secondary intensity and is unable to affect the automatic adjustment of the receiving equipment carried upon aircraft. While a large number of transmitter stations are required, the cost thereof is relatively insignificant as compared to the cost, for example, of building a network of automobile highways. The actual power required for each beam transmitter is relatively small for long range effectiveness as compared to that of an ordinary broadcasting station, for in the system of my invention, the transmitting energy is concentrated in a narrow beam and operated over a distance where the energy in the beam is effective upon the receiving apparatus, which energy is subsequently renewed by the successive transmitter stations constructed for defining a particular beam in a survey direction across the country. My system of directively transmitted beams extending both longitudinally and laterally with respect to each other over the area of the country may employ loop transmitters having a figure of eight characteristic or a directively transmitted beam which radiates in one direction only. Loop transmitters are desirable where blind spots appear to exist in certain parts of the country against the direct transmission of a beam.

In cases where the identifying feature of each beam is its wave length, it is not necessary to use a very large number of frequencies in order to thoroughly cover a country such as the United States. The thing that is necessary is a continuity of frequencies in a step by step variation from one band into another. A periodic variation can be utilized. For example, in defining the country from the Atlantic coast to the Pacific coast this distance can be divided into equal zones, for example, corresponding to the time zones or as I have illustrated in Fig. 1, six zones may be employed as represented by A, B, C, D, E, and F, each zone being about 500 miles in length. That is, zones are divided into approximately thirty frequency bands of equal width. These bands have in the above example an approximate separation of 16.66 miles each. Twenty-five bands of 20 miles in width per zone may be successively utilized and still impart accurate information to the navigator for enabling the navigator to know his position at all times throughout the flight. Between each zone a separating beam of frequency which I have designated as being of a frequency $f$ is provided running north and south. The first band, furthest east on each zone has a frequency of $f+a$; the second band beam $f+2a$; the third $f+3a$ ... the fifteenth $f+15a$. From then on the frequency drops gradually so that the 16th band has $f+14a$ ... the thirtieth, $f+a$ again and then comes the separating beam of frequency $f$ and after that the next zone with the same variations. In other words, all that is required for covering this whole distance is a band of $15a$ kilocycles. If a separation between beams of $a=2$ kilocycles is taken, all that is required would be 30 kilocycles.

If an allocation is made in the short wave band, say around thirty-five meters, the system of my invention requires only a frequency allocation of from 35.8 to 36 meters. If the allocation is closer to 200 meters, the entire system may operate upon allocations between 196.1 and 200 meters. If the broadcasting band is allotted for the aircraft navigation system of my invention, the wave lengths required would be obtainable between 476 and 500 meters or between 698 and 750 meters. The numbers given are merely for the purpose of illustration as indicating the relatively narrow range of wave lengths or frequencies which is required. It is appreciated that frequencies for the transmission of signaling energy are in great demand but from considerations of safety in air navigation, the relatively small frequency spectrum required for the operation of the radio beacon system of my invention may be readily allocated from the available frequencies if the transmission channels which I have designated as extending across the country in both lateral and longitudinal directions are utilized for conveying modulated signals, utilizing either voice or television modulation, the separation between bands and the factor $a$ in the expressions $f+a$, $f+2a$, supra, will have to be greater according to the frequency band required to cover the modulation frequency of the messages of the signals without interference between adjacent bands. The numerical relationships which I have referred to are intended for transmission of telegraphic signals which do not require wide signaling bands. Telegraphic signals identifying the different channels may be readily picked up by the aircraft in the course of its flight to impart to the pilot sufficient identifying data to give the pilot a sense of direction and location.

The same grouping in zones could be used for the parallel beams running east and west, but in order or diversify my example, I shall consider only one zone with beams starting from a frequency F and gradually increasing to $F+NA$, in which N equals the total number of bands divided by two and A is the number of kilocycles between adjacent beams. If a width of say 2,000 miles is to be covered, there would have to be 100 bands of 20 miles each. N would equal 50. If these bands are separated by only one kilocycle, a band of only fifty kilocycles is necessary, which is less than double the one above.

In the drawings, Fig. 1 illustrates the relative location of the lateral and longitudinally extending signaling beams across the country produced by either beam transmitters or loop transmitters.

In Fig. 2, the beams which extend in the direction east to west have been numbered 1, 2, 3, and 4 in zone B which are radiated simultaneously from correspondingly numbered transmitter stations. Similar beam transmitter stations are shown in zone A at 1a, 2a, 3a, and 4a which reestablish the paths of the transmitted energy by simultaneous transmission. The beams which extend normal to the signaling channels 1—4 are represented in zone B at 1', 2', 3' and 4' radiated simultaneously from correspondingly numbered transmitters.

In each zone the several signaling beams have a step by step progression in some selected characteristic. Similarly, the meridian beams distinguish one from another progressively in some selected characteristic. The progression characteristic of the signaling channels in the different zones may vary from a maximum to a minimum and then the progression may repeat in the succeeding zone so that a periodical variation is obtained across the entire country. The fact that signaling channels of somewhat similar character may exist in adjacent zones, will not be confusing to the pilot who determines his location and direction by receipt of signaling energy from such channels, as I always provide a sufficient distinguishing difference between the channels as to inform the pilot with respect to the zone in which the craft may be navigating. The signaling channels are all characteristically defined either by the frequency of the carrier wave or by the audio frequency of the modulation, or by means of characteristic signals superimposed upon the carrier wave. Each set of signaling channels is assigned to geographically cover a certain territory. By arranging the adjacent signaling channels in step by step progression with respect to frequency, the receiving apparatus carried aboard the craft which is navigated with respect to the beam network may be variably tuned to pick up the several signaling channels throughout a frequency band and the pilot informed as to his location by the characteristic frequency emitted by the several channels or by means of the characteristic signals superimposed upon the several channels. Where the allocation of a reasonable number of frequencies is difficult to secure by reason of congested use of signaling channels for other purposes, I may employ a single emission frequency for the north and south channels and a different frequency for the east and west channels. However, the same step by step progression in signal characteristic is arranged on the several channels inasmuch as the character of the signals which are superimposed upon the signaling beams is varied from one beam to another. With the two standard frequencies employed for navigation, the same periodical variation in character of the energy throughout the several zones is obtained inasmuch as the characteristics of the emitted signals on the several channels distinguish one channel from another.

In Fig. 1 of the drawings, the multiplicity of signaling beams have been designated by the division lines 7 running east and west, and by the division lines 8 running north and south. That is to say, there is an independent directively transmitted beam along each of the designating lines at 7 and 8 and the receiver on aircraft will respond to either the north and south or east and west beam for definitely locating the position of the craft. The heavy lines which I have designated at 9 and 10 serve to divide the several groups of transmitters into zones, the characteristics of which periodically vary over the country from maximum to minimum to insure the transmission of distinctive signals. I have indicated the east and west beams as graduated from 0 to 50, that is, F, F+10, F+20, F+30, F+40, and F+50, extending in arithmetic progression on each of the radiating beams designated at 7 on opposite sides of the parallel 9. The north and south beams change in character in arithmetic progression from 0 to 15 and from 15 to 0 periodically repeating across the country. In each zone A, B, C, D, E and F, there is an eastern portion designated E and a western portion designated W. The total kilocycle variation in any one of the zones A to F, inclusive, is within the range $f+30$. Correspondingly calibrated dials on the associated receiving apparatus serve to designate responses obtained either from the north and south beams or from the east and west beams.

The north and south beams in the signaling system of my invention are accurately surveyed upon the initial installation thereof so that these beams are extremely useful in navigation for true north determination and on any one of these beams the pilot may obtain bearings which he knows are accurately true north. The receiving apparatus employed by the pilot is adapted to receive all of the frequencies in any of the zones through which the pilot navigates. The arrangement of the receiving circuits is set forth more fully in my copending application on "radio beacon systems", filed concurrently with the filing of this application. Observations may be taken either on the meridian beams or upon the beams extending normal thereto whereby the pilot is informed accurately as to geographical position.

In order to establish the periodically varying paths of signaling energy across the country, I may provide extended wire lines which are accurately erected at right angles one to another across the country, thus forming a radiating network for high frequency energy where the same step by step progression or distinctive characteristic exists in the several zones as has been hereinbefore explained.

For the economic separation of the signaling channels, the characteristic emission on the several channels should be controlled in accordance with telegraphic code signals. Narrow bands have the advantages of economy of wave length allocation although they have the disadvantage of requiring very sharply tuned apparatus involving more stages of amplification with very loose couplings and are inherently less sensitive. Wider bands have the advantage of enabling the transmission of certain additional signals on their channels such as weather information, time signals, or photographic or television signals.

While I have described a preferred embodiment of my invention, I desire that it be understood that modifications may be made and that no limitations upon my invention are intended other than are imposed by the scope of the appended claims.

What I claim as new and desire to secure by Letters Patent of the United States is as follows:

1. A beam network system comprising a multiplicity of groups of directive transmitters, each of said groups of transmitters being arranged to emit signaling energy in directed beams in different directions in step by step progression over a relatively large area, said beams intersecting each other in predetermined positions.

2. A beam transmission system comprising a multiplicity of directive transmitters located to emit signaling energy in directed beams, one group of transmitters being arranged to emit directed beams of signaling energy in channels extending substantially normal to the beams of energy emitted by another group of transmitters, the signaling energy emitted by each group of transmitters varying in character in step by step progression.

3. A beam network comprising groups of signal transmitters each adapted to directively transmit signaling energy in parallel directed beams, the beams of energy emitted by one group of transmitters extending substantially normal to the beams of energy emitted by another group of transmitters, the signaling energy of the several transmitters varying in step by step progression.

4. A beam network system comprising a multiplicity of groups of signal transmitters, the transmitters of one group emitting energy on directed beams extending normal to the beams of energy emitted by the transmitters of another group, the signaling energy on the several beams differing in character progressively from one beam to another in each group of transmitters.

5. A beam network system comprising a multiplicity of groups of high frequency signaling transmitters arranged in separate zones, the transmitters of each zone being arranged to emit signaling energy in substantially parallel beams characterized by a step by step progression, said beams of transmitted signaling energy periodically varying in the several zones including said transmitters.

6. A beam network comprising a multiplicity of signal transmission zones, groups of signal transmitters located in each of said zones and arranged to simultaneously radiate signaling energy in step by step progression in parallel directed beams, the beams of one group of transmitters extending normal to the beams of another group of transmitters, said groups of transmitters in the several zones being related one to another in periodical variation.

7. A beam network comprising a multiplicity of directive transmitters divided into north and south and east and west groups, the characteristics of the transmitters in each of said groups varying one from another in a step by step progression, and in a periodical variation among the several groups.

8. A beam network comprising a multiplicity of directive transmitters disposed in different geographical locations, said transmitters being formed into groups for propagating beams of high frequency energy in parallel related courses, the transmitters of each group being characteristically defined one to another, and the several groups of transmitters having characteristics which differ according to a periodical variation.

9. A beam network system comprising a multiplicity of directive transmitters arranged in multiple groups with the transmitters of each group disposed in alignment with transmitters arranged in similar groups within the transmitting range of the transmitters of the first mentioned groups for the emission of beams of signaling energy in multiple channels extending normal to each other.

10. A beam network transmission system comprising a multiplicity of transmitters arranged in groups with the transmitters of each of the groups aligned one with another for the emission of signaling energy in beams having overlapping relationship with respect to each other for the emission of signaling energy in parallel channels in directions normal to each other.

11. A beam network system comprising a multiplicity of directive transmitters, said directive transmitters being disposed in alignment one with another for the emission of signaling energy overlapping the distances between the transmitters for establishing a directively transmitted signaling channel, said transmitters being arranged in groups for the establishment of a multiplicity of parallel related signaling channels with the channels of one group of transmitters extending normal to the channels of another group of transmitters.

12. A beam network comprising a multiplicity of directive transmitters disposed in alignment one with respect to another and spaced for a distance less than the transmission range of said transmitters, said transmitters being disposed in groups and having the transmission characteristics differing one from another, the transmitters of one group emitting signaling channels normal to the signaling channels emitted by the transmitters of another group.

In testimony whereof I affix my signature.

MARCEL WALLACE.